United States Patent [19]

Nicholson et al.

[11] Patent Number: 4,635,099
[45] Date of Patent: Jan. 6, 1987

[54] APPARATUS FOR DETECTING NONSTANDARD VIDEO SIGNALS

[75] Inventors: Warren H. Nicholson, Plainsboro; Walter E. Sepp, Plainsboro Township, Middlesex County, both of N.J.

[73] Assignee: RCA Corporation, Princeton, N.J.

[21] Appl. No.: 697,907

[22] Filed: Feb. 4, 1985

[51] Int. Cl.[4] .................... H04N 9/44; H04N 5/04
[52] U.S. Cl. ..................... 358/17; 358/148; 358/149
[58] Field of Search ............ 358/17, 19, 153, 158, 358/320, 337, 149, 148

[56] References Cited

U.S. PATENT DOCUMENTS

| | | | |
|---|---|---|---|
| 3,688,037 | 8/1972 | Ipri | 358/158 |
| 3,906,155 | 9/1975 | van Straaten | 358/158 |
| 4,025,951 | 5/1977 | Eckenbrecht | 358/158 |
| 4,159,481 | 6/1979 | Mikado | 358/19 |
| 4,203,135 | 5/1980 | Sasaki | 358/149 |
| 4,253,116 | 2/1981 | Rodgers, III | 358/149 |
| 4,335,403 | 6/1982 | Strivastava | 358/148 |
| 4,387,397 | 6/1983 | Dietz | 358/154 |
| 4,433,348 | 2/1984 | Stockham, Jr. et al. | 360/51 |
| 4,445,135 | 4/1984 | Heitmann et al. | 358/19 |
| 4,454,531 | 1/1984 | Elmis et al. | 358/17 |
| 4,468,699 | 8/1984 | Kröner | 358/148 |
| 4,503,455 | 3/1985 | Oshima | 358/19 |
| 4,504,862 | 3/1985 | Achtstaetter | 358/158 |
| 4,509,072 | 4/1985 | Elmis et al. | 358/17 |
| 4,580,165 | 4/1986 | Patton et al. | 358/148 |

FOREIGN PATENT DOCUMENTS 59-23971 7/1982 Japan .

Primary Examiner—James J. Groody
Assistant Examiner—Michael P. Dunnam
Attorney, Agent, or Firm—E. M. Whitacre; P. J. Rasmussen; K. N. Nigon

[57] ABSTRACT

Circuitry for detecting nonstandard video signals is disclosed. This circuitry is used in a sampled data video signal processing system to control signal processing steps which utilize a frame store memory. The detecting circuitry includes a programmable counter which generates a standard horizontal pulse signal having a 70 ns pulse width by counting down a sampling clock signal that has a frequency proportional to the color subcarrier frequency of the video signals. The circuitry generates another horizontal pulse signal having a pulse width of less than 140 ns from the horizontal sync pulses of the input video signals. These pulse signals are compared in a coincidence detector which produces a signal that is in a first state when the pulses of the two signals overlap at least once in every twenty-five horizontal line times and in a second state otherwise. This coincidence signal and the field rate vertical synchronizing signal from the input video signal are used to generate the control signal for the frame store memory. This control signal is in a first state when the coincidence signal has been in its first state for at least one frame time and that changes to a second state when the coincidence signal changes to its second state.

18 Claims, 5 Drawing Figures

APPARATUS FOR DETECTING NONSTANDARD VIDEO SIGNALS

The present invention relates to apparatus for detecting nonstandard video signals which may be useful in video signal processing circuitry that includes field or frame memories.

Field and frame store memories may be used in such video signal processing systems as comb filters, progressive scan systems and temporal noise reduction systems. In each of these systems, samples that are separated by a field or frame time are combined to produce processed samples. These systems are generally designed to operate on signals that are well correlated from field to field or from frame to frame. When video signals are not well correlated because of interfield motion or because the signals are produced by a nonstandard source, the performance of the field or frame memory signal processor may be degraded.

It is desirable to at least partially defeat the field or frame processing when a lack of correlation is detected to minimize degradation of the reproduced image. For example, many frame memory signal processing systems include motion detectors which modify or circumvent the frame memory processing steps for portions of the image that display moving objects.

As set forth above, signals from nonstandard sources, or nonstandard signals, may be poorly correlated from field to field or frame to frame. As used in this application, the term nonstandard signal means a color video signal in which the ratio of the chrominance subcarrier frequency, $f_{sc}$, to the horizontal line frequency, $f_H$, deviates significantly from the defined standard. This ratio may be critical for sampled data video signal processing systems, such as digital television receivers. In these systems, the sampling rate is usually chosen to be a multiple of $f_{sc}$ to take advantage of signal interrelationships dictated by the particular video signal standard. For example, in the NTSC standard, the frequenc $f_{sc}$ is the 455th harmonic of one-half of the line frequency $f_H$. Since, $f_{sc}$ is a harmonic of one-half $f_H$, there is a 180° phase shift in the chrominance signal from line to line and from frame to frame, while there is no phase shift in the luminance signal components. This relationship is exploited by frame and line comb filters to separate the luminance and chrominance components of the composite video signals. When composite video samples taken at a $4f_{sc}$ rate are subtracted from samples delayed by one line or one frame time, the luminance components of the samples tend to cancel, leaving only the chrominance components. Similarly, when samples separated by one line or one frame are added, the chrominance components tend to cancel leaving only the luminance components. For a frame comb filter to be effective, the samples from the two frames should be closely aligned. If misaligned samples are applied to a comb filter, the luminance and chrominance components of the samples may be uncorrelated and, consequently, the comb filter may produce distorted chrominance and luminance signals.

Sample misalignment from field to field or from frame to frame may be a problem for other types of field or frame memory signal processors as well. For example, when the average ratio of $f_{sc}$ to $f_H$ does not match the standard ratio, as in some video games and personal computers, the image may skew from field to field. This skew may cause a field progressive scan system to display a jagged image and may cause a uniform loss of horizontal image resolution for signals processed by a recursive noise reducing filter.

Misalignment problems can occur, however, even when the average ratio of $f_{sc}$ to $f_H$ matches the standard ratio, if the instantaneous ratio changes significantly from line to line. For example, in video tape recorders (VTR's) and in video disk players the line frequency, $f_H$, is determined by the speed of the tape or disc while the subcarrier frequency, $f_{sc}$, is determined by a piezoelectric crystal. Because of imperfections in the tape or disk, $f_H$ may vary significantly from line to line while $f_{sc}$ remains relatively fixed. This variation in the ratio of $f_{sc}$ to $f_H$ may produce distortion on the edges of objects for images processed by a frame or field comb filter, it may randomly reduce the horizontal resolution of a temporal noise reducing system and it may cause a progressive scan system to display a jagged image.

Nonstandard signal detectors exist which will discriminate between broadcast and cable television signals, which conform closely to the standard, and nonstandard video game or personal computer signals. Many of these detectors, however, may not be able to detect nonstandard signals from VTR's and video disk players.

U.S. Pat. No. 4,335,403 entitled "Horizontal Countdown System For Television Receivers" discloses one type of nonstandard signal detector. This detector compares a "processed sync pulse", having a 280 ns pulse width with a "flyback center pulse" having a 560 ns pulse width. Assuming that a 70 ns overlap is needed to detect coincidence, this system allows signals which may deviate from the standard by as many as six 70 ns samples in a horizontal line to pass as standard signals. These signals could seriously degrade the performance of a field or frame signal processor.

Another nonstandard signal detector is described in U.S. Pat. No. 4,454,531 entitled "Digital Circuit For Providing A Binary Signal On The Occurrence Of A Predetermined Frequency Ratio Of Two Signals". The detector described in this reference uses a counter to derive a horizontal line frequency pulse from a sampling clock signal which is fixed in frequency relative to the color subcarrier frequency. A monostable multivibrator, or one-shot, stretches these horizontal frequency pulses to be at least two clock periods wide. The stretched pulses are applied to the up/down input of a second counter and horizontal sync pulses, derived from the input signal, are applied to the clock input of the second counter. The second counter counts up for any horizontal sync pulse which falls within the window defined by the stretched horizontal line frequency pulse (i.e. for standard signals) and counts down for horizontal sync pulses which do not fall within this window (i.e. for nonstandard signals). If the value held by the second counter at the end of a field is above a predetermined threshold, the signals which generated the field are presumed to be standard and the value held by a third counter is incremented. If, however, the value held by the second counter at the end of a field falls below this threshold, the value held by the third counter is set to zero. When the value in the third counter reaches approximately 1000, the output signal of the detector changes to indicate that standard signals are being processed.

The 1000 field delay may make this detector unsuitable for use with a field or frame memory. A temporary loss of coincidence in an otherwise standard signal due to a change between two cameras, for example, may cause the detector to disable the field or frame memory processing, reducing the quality of the displayed image. In the NTSC system, the 1000 field delay would cause the low quality image to be displayed for 13 seconds before field or frame memory signal processing would be allowed to resume.

It is an object of the present invention to provide a nonstandard signal detector which discriminates between video signals having horizontal line frequency to color subcarrier frequency ratio which closely conforms to a predefined signal standard and video signals which do not so conform.

It is a further object of the present invention to provide a nonstandard signal detector which uses less complex apparatus than prior nonstandard signal detectors.

SUMMARY OF THE INVENTION

The present invention is circuitry for detecting nonstandard video signals. This circuitry includes apparatus for frequency dividing a clock signal that is phase locked to the color burst signal or to the horizontal sync signal to produce an output signal having a frequency ratio with respect to the color subcarrier frequency, $f_{sc}$, substantially equal to a ratio between $f_H$ and $f_{sc}$ established by a video signal standard and a pulse width less than two periods of the clock signal. The detector also includes circuitry for deriving horizontal sync pulses from the composite video signal, providing sync pulses that have pulse widths of no more than one-half of the period of $f_{sc}$. The detector further includes a coincidence detector for producing a pulse signal that has a pulse width greater than a predetermined number of periods of the horizontal sync signal. The signal provided by the coincidence detector controls the frequency divider to change the ratio used to produce an output pulse.

DETAILED DESCRIPTION

Figure 1:
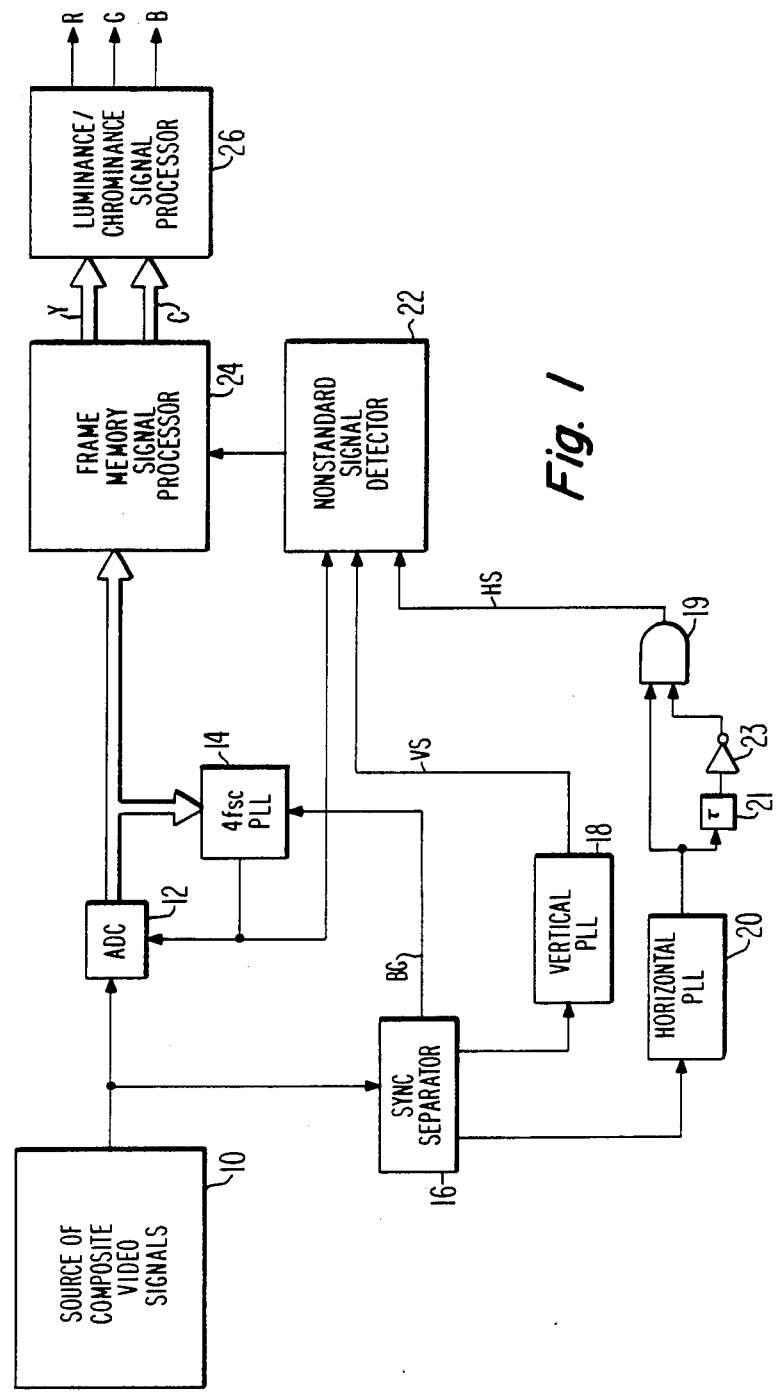
FIG. 1 is a block diagram of a portion of a digital television signal processing system incorporating an embodiment of the present invention.

In the drawings, broad arrows represent busses for multiple-bit parallel digital signals. Line arrows represent connections carrying analog signals or single bit digital signals. Depending on the processing speed of the devices, compensating delays may be required in certain of the signal paths. One skilled in the art of digital circuit design would know where such delays would be needed in his particular system.

In FIG. 1, a source of composite video signals 10, which may include the tuner, intermediate frequency amplifier and video detector of a conventional color television receiver, provides analog composite video signals to sync separator circuit 16. The sync separator 16 generates horizontal and vertical synchronization pulses and burst gate pulses from the analog composite video signals by conventional means. The horizontal synchronization pulses are applied to the horizontal phase locked loop (PLL) 20. PLL 20 produces a signal which is phase locked to the horizontal synchronization pulses from sync separator 16. Ideally, PLL 20 has a relatively wide lock-in range so that it may respond quickly to phase shifts in the horizontal synchronization pulses derived from the composite video signals. A suitable horizontal phase locked loop may be built from conventional components, such as the RCA CD4046A integrated circuit.

The PLL 20 is not an essential part of the present invention. Its primary function is to provide relatively noise-free horizontal synchronization signals. In systems where noise immunity is not an important design consideration, the PLL 20 may be removed.

The phase-locked horizontal line frequency pulses from PLL 20 are applied to pulse forming circuitry which includes AND gate 19, delay element 21 and inverter 23. The output terminal of PLL 20 is connected to delay element 21 and to one input terminal of AND gate 19. Delay element 21 provides delayed pulses to inverter 23, the output terminal of which is connected to the second input terminal of AND gate 19. The pulses provided by AND gate 19 start at substantially the same time as the pulses from PLL 20 but have a pulse width approximately equal to the delay provided by delay element 21. In the present embodiment, this delay is less than 140 ns so that the signal HS, provided by AND gate 19, is a horizontal line frequency pulse signal that is phase-locked to the horizontal sync component of the received composite video signal and that has a relatively narrow pulse width (i.e. less than two periods of the $4f_{sc}$ clock signal).

The vertical synchronization pulses from sync separator 16 are applied to a conventional vertical frequency PLL 18 which produces a vertical synchronization signal, VS. Signal VS is locked in frequency and phase to the vertical synchronization pulses derived from the composite video signals by sync separator 16.

The burst gate signal, BG, is applied by sync separator 16 to a PLL 14 which produces a sampling clock signal that has a frequency four times the frequency of the color subcarrier signal and that is phase-locked to the color synchronizing burst component of the composite video signals. PLL 14 may be a conventional digitally controlled PLL similar to the one disclosed in U.S. Pat. No. 4,291,332 entitled "Phase-Locked Circuit". The $4f_{sc}$ clocking signal provided by PLL 14 is applied to analog to digital converter (ADC) 12 to control the rate at which digital samples, representing the composite video signals from source 10, are produced by the ADC 12. Digital samples provided by ADC 12 are applied to PLL 14. PLL 14 uses the burst gate signal, BG, to extract from these composite video samples the color burst samples which are used to phase-lock the $4f_{sc}$ clock signals.

Although, in the present embodiment, the $4f_{sc}$ clock signal is phase-locked to the color burst signal, it is contemplated that the invention may also use a horizontal-line-locked clock signal. A horizontal-line-locked clock signal may be generated by phase locking the $4f_{sc}$ clock signal to the signal provided by a relatively narrow bandwidth horizontal frequency PLL. No horizontal-line-locked clock signal generator is shown since it is not considered a part of the present invention.

The horizontal and vertical synchronization signals, HS and VS and the $4f_{sc}$ clock signal are applied to nonstandard signal detector 22.

Figure 2:
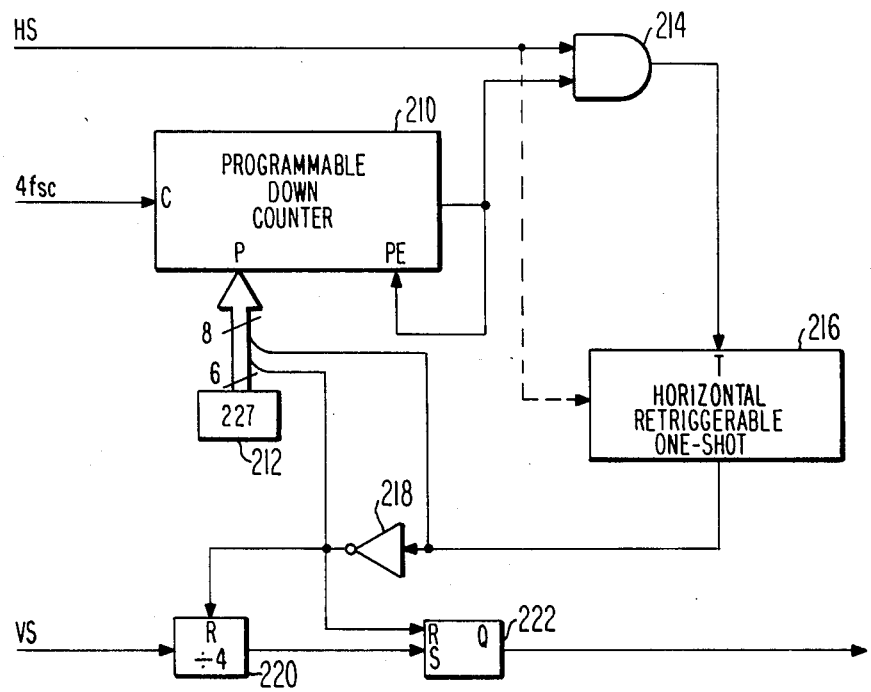
FIG. 2 is a block diagram showing a nonstandard signal detector suitable for use in the embodiment shown in FIG. 1.

FIG. 2 is a block diagram showing details of nonstandard signal detector 22. In this figure, The $4f_{sc}$ clock signal is applied to the count input terminal C of programmable down counter 210. An eight-bit digital value is applied to the preset input port P of counter 210 by digital value source 212, retriggerable one-shot 216 and inverter 218. As explained below, counter 210 may be preset to count down from one of two values. One of these values is used to change the phase of the horizontal sync signal provided by the down counter to align it to the phase of the received horizontal sync pulses. The other value is used to produce a horizontal sync signal which conforms to the ratio between $f_{sc}$ and $f_H$ set by the applicable signal standard when the phases of the two signals are aligned.

When the counter 210 counts down to zero, it produces a logic high output signal. This signal is applied to the preset enable input terminal (PE) of the counter 210. The logic high signal applied to terminal PE sets the counter to the value applied to its preset input port synchronous with the leading edge of the next $4f_{sc}$ clock pulse. Since the counter value is no longer zero after it is preset, the counter produces a logic low output signal. Accordingly, counter 210 produces output pulses that are approximately $1/(4f_{sc})$ wide at approximately one horizontal line (IH) time intervals.

The pulses from counter 210 are applied to one input terminal of AND gate 214. The horizontal sync signal, HS, from the AND gate 19 is applied to the other input terminal of AND gate 214. AND gate 214 is a coincidence detector. It produces an output pulse when the horizontal pulses from PLL 20 and from counter 210 overlap in time. This coincidence pulse is applied to the trigger input terminal, T, of horizontal retriggerable one-shot 216. One-shot 216 converts a coincidence pulse applied to its trigger input terminal into an output pulse that is a predetermined number of horizontal line periods wide. One-shot 216 is retriggerable, so that, once triggered, each subsequent coincidence pulse extends the output pulse of the one-shot by the predetermined number of horizontal line periods.

In the present embodiment, the output pulses provided by one-shot 216 are 25 horizontal line periods wide. Consequently, the output of the one-shot 216 maintains a logic high state if a coincidence is detected at least once in each 25 horizontal line intervals. This signal has been found to be a good indicator of standard or nonstandard signals; it is in a logic high state when the ratio between $f_{sc}$ and $f_H$ closely approximates the standard ratio and when the deviations about this ratio from line to line are minimal.

The output signal from one-shot 216, is inverted by inverter 218 and applied to the reset input terminals of the frequency divider 220 and the set-reset flip-flop 222. The vertical sync signal VS from PLL 18 is applied to the signal input terminal of frequency divider 220. Frequency divider 220, which frequency divides the field rate vertical sync signal by four, develops a signal that has a two-frame period and a 50% duty cycle. The output signal from frequency divider 220 is applied to the set input terminal of flip-flop 222.

When standard signals are being processed, the reset input signals to frequency divider 220 and flip-flop 222 are both in a logic low state and, after at least two fields of standard signal have been processed by the frequency divider 220, the set input signal to the flip-flop 222 is in a logic high state. Consequently, the signal provided by flip-flop 222 is in a logic high state.

When a nonstandard signal is detected, however, inverter 218 applies a logic high signal to the reset inputs of the frequency divider 220 and the flip-flop 222. This signal resets the frequency divider, changing the signal applied to the set input of the flip-flop 222 and the signal provided by the flip-flop to logic low signals. When the output signal from inverter 218 again changes to a logic low state, indicating that standard signals are being processed, the output signal from flip-flop 222 remains in a logic low state for one frame time. This delay allows the frame memory signal processing circuitry to store one frame of standard signals before frame processing is resumed.

As stated above, programmable down counter 210 may be preset to count down from one of two values. The six most significant bits of each of these values are supplied by source 212. The two least significant bits are supplied by inverter 218 and one-shot 216. In the present embodiment, the value provided by source 212 is $E3_{16} (227_{10})$ (the subscripts 16 and 10 indicate hexadecimal and decimal notation respectively). When the two least significant bits are concatenated to this six bit value, preset values of $38D_{16} (909_{10})$ and $38E_{16} (910_{10})$ are obtained, corresponding to the output signal of the one-shot being in a logic high and a logic low state respectively.

When the counter 210 is preset to 909, one pulse is emitted by the counter for every 910 pulses of the $4f_{sc}$ clock signal. The counter cycles every 910 instead of 909 clock pulses because it has a synchronous preset. After the counter has processed 909 clock pulses to count from 909 to zero, a logic high signal is applied to its preset enable input and synchronous with the next clock pulse, the 910th, the counter is preset to 909.

When the counter 210 is preset to 910, the counter cycles every 911 clock pulses and the signal provided by the counter 210 has a frequency slightly less than $f_H$. In this mode, the pulses produced by the counter 210 drift relative to the horizontal sync pulses until a pulse provided by the counter 210 coincides with a horizontal sync pulse from AND gate 19. It is contemplated that the rate of drift between the horizontal sync pulses and the pulses provided by the counter may be changed by changing the difference between the two count values or by changing the magnitude of the count values to change the period of the signals produced by the counter to be a multiple or a fraction of a horizontal line period.

Figure 3:
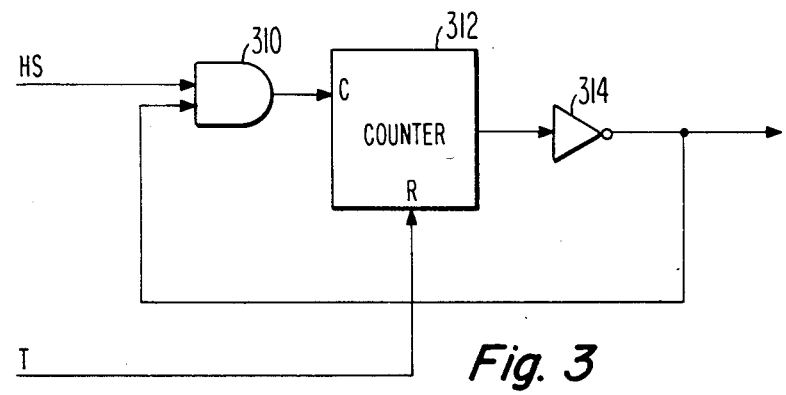
FIG. 3 is a block diagram of a digital retriggerable one-shot which may be used in the nonstandard signal detector shown in FIG. 2.

As described above, one-shot 216 may be a conventional monostable multivibrator, having a pulse-width time constant determined by a resistor-capacitor (RC) network. FIG. 3 shows an alternative implementation of the one-shot 216 which does not need an RC network. Horizontal sync pulses from PLL 20 are applied to the one-shot 216 as shown in phantom in FIG. 2. These horizontal sync pulses are applied to one input terminal of AND gate 310. The output signal of the AND gate 310 is applied to the count input terminal, C, of counter 312. The output terminal of counter 312 is connected to the input terminal of inverter 314 which provides the output signal of the one-shot. This output signal is applied to the second input terminal of AND gate 310. The trigger input terminal of the digital one-shot is the reset input terminal, R, of the counter 312.

When the output signal of the counter is in a logic high state (i.e. when the counter has counted to its maximum value), the output of inverter 314 is in a logic low state. The logic low signal from inverter 314 disables AND gate 310, so horizontal sync pulses are not applied to the count input terminal of the counter 312. When a pulse is applied to the reset terminal of counter 312, however, the output signal of the counter changes to a logic low state, and the inverter 314 applies a logic high signal to enable AND gate 310 to pass horizontal sync pulses. Counter 312 counts these pulses until it reaches its maximum value and once again disables the AND gate. In the present embodiment, the maximum value of the counter 312 is 25.

Referring again to FIG. 1, the nonstandard signal detector 22 applies its output signal to frame memory processor 24. Processor 24 may, for example, include a comb filter or a recursive noise reducing filter. Processor 24 processes the digitized composite video samples applied to it by ADC 12. In this embodiment of the invention, processor 24 provides separated luminance and chrominance signals, Y and C respectively to luminance/chrominance signal processor 26. Processor 26 may include circuitry to demodulate the C signal into color difference signals and circuitry to combine the color difference signals with the luminance signal to produce the primary color signals R, G and B. These primary color signals may be used to drive a display device (not shown).

Figure 4A:
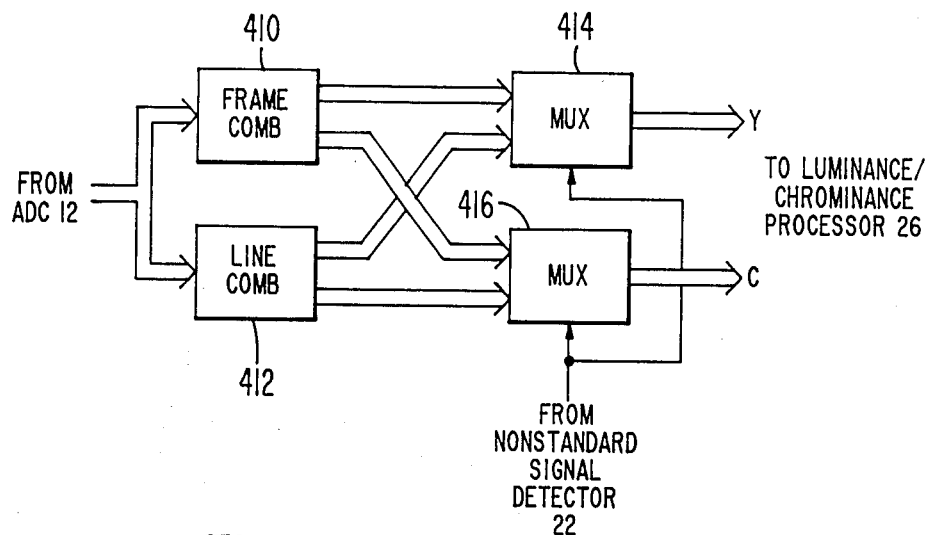
FIG. 4A is a block diagram showing an adaptive comb filter suitable for use with the embodiment shown in FIG. 1.

FIG. 4A is a block diagram of an adaptive frame comb filter which may be used in the present embodiment of the invention. Composite video samples are simultaneously applied to a conventional frame comb filter 410 and to a conventional line comb filter 412. The luminance signals from the frame comb filter 410 and from the line comb filter 412 are applied to separate data input ports of multiplexer 414. Similarly, the chrominance signals from filters 410 and 412 are applied to separate data input ports of multiplexer 416. The signal provided by nonstandard signal detector 22 is applied to the control input terminals of multiplexers 414 and 416. Each of the multiplexers 414 and 416 is configured to pass the signal from the frame comb when the control signal is in a logic high state and to pass the signal from the line comb when the control signal is in a logic low state. As stated above, the control signal changes to a logic high state only after one frame of standard signals has been received. This allows the frame comb filter 410 to accumulate one frame of standard samples before frame memory processing is resumed.

Figure 4B:
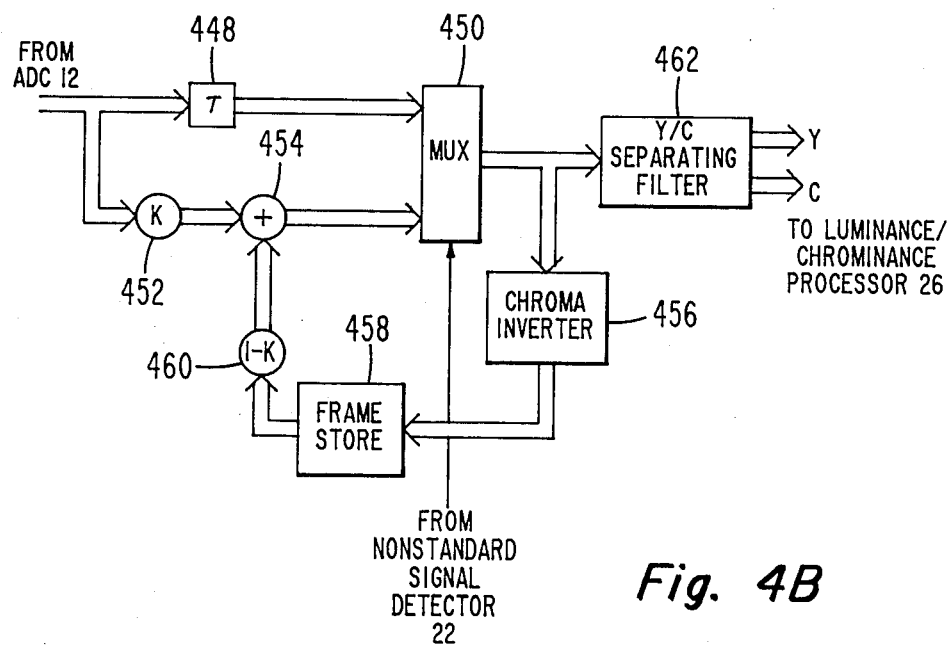
FIG. 4B is a block diagram showing a recursive noise reducing filter suitable for use with the embodiment of the invention shown in FIG. 1.

FIG. 4B is a block diagram of a recursive noise reducing filter suitable for use with the embodiment of the invention shown in FIG. 1. Composite video samples are applied to sample scaler 452 by ADC 12. Scaler 452 multiplies each of the samples by a scale factor K and applies the scaled samples to one input port of adder 454. Adder 454 adds these scaled samples to corresponding samples from frame store 458 that have been scaled by a factor of 1−K in sample scaler 460. The samples developed by adder 454 are applied to one data input port of multiplexer 450. Composite video samples from ADC 12 via delay element 448 are applied to the other data input terminal of multiplexer 450.

Delay element 448 provides compensating delay substantially equal to the processing time through sample scaler 452 and adder 454. The control signal applied to multiplexer 450 is the output signal provided by nonstandard signal detector 22. When this signal is in a logic high state, the multiplexer 450 applies the samples from adder 454 to the input port of Y/C separating filter 462. When the signal from detector 22 is in a logic low state, the multiplexer 450 applies the samples from delay element 448 to filter 462. Y/C separating filter 462 may extract the luminance and chrominance components from the composite video samples by conventional means providing a luminance signal Y and a chrominance signal C to luminance/chrominance processor 26.

Composite video samples from the multiplexer 450 are also applied to the input port of chroma inverter 456. The chroma inverter 456 inverts the chrominance components of these samples. The composite video samples provided by chroma inverter 456 are applied to the frame store 458. Frame store 458 may be a conventional shift register type frame memory. In an NTSC signal processing system, this memory may have 477,750 pixel storage locations.

Samples delayed by one frame time relative to the samples from ADC 12 are applied to the input port of sample scaler 460 by frame store 458. Sample scaler 460 multiplies these samples by a factor of 1−K. These scaled samples are added to the samples provided by sample scaler 452. The chrominance signal phases of the samples from scalers 452 and 460 are the same because the chroma inverter 456 reverses the phase of the frame delayed samples before applying them to the frame store.

Sample scalers 452 and 460, adder 454, chroma inverter 456 and frame store 458 constitute a conventional one-frame recursive noise reducing filter. A more detailed description of this filter can be found in the article by McMann et al. entitled "A Digital Noise Reducer For Encoded NTSC Signals", *SMPTE Journal,* Vol. 87, No. 3, pp. 129-133 (March, 1978), which is incorporated herein by reference.

Although the present embodiment of the invention is a digital color television signal processing system including a frame memory processor, it is contemplated that the invention may also be practiced in an analog system which uses a charge-coupled device (CCD) or delay line frame store memory or in analog or digital systems which use field store memories. It is also contemplated that the invention may be used in systems which store frames or fields of processed video signals as well as in systems which store composite video signals.

What is claimed is:

1. In a video signal processing system including a source of composite video signals which may include a color burst signal component and a horizontal synchronizing pulse signal component, and means coupled to said source for developing a clock signal having a frequency substantially proportional to the frequency of said color burst signal, a nonstandard signal detector comprising:

frequency dividing means coupled to said clock signal developing means and responsive to a control signal being in first and second states for alternatively providing one of first and second pulse signals respectively, said first pulse signal having a frequency substantially equal to the average frequency of said horizontal synchronizing pulse signal and said second pulse signal having a frequency significantly different from the average frequency of said horizontal synchronizing pulse signal, the pulse width of said first and second pulse signals being less than twice the period of said clock signal;

means coupled to said source of composite video signals for developing a horizontal pulse signal which is substantially synchronized to said horizontal synchronizing pulse signal component and which has a pulse width that is less than one-half of the period of said color burst signal component; and coincidence detecting means coupled to said frequency dividing means and to said horizontal pulse signal developing means for generating a control signal for said frequency dividing means that is in said first state when the pulses of the signal provided by said frequency dividing means overlap the pulses of said horizontal pulse signal at least once in a predetermined number of periods of said horizontal pulse signal and that is in said second state otherwise.

2. The nonstandard signal detector set forth in claim 1 wherein said coincidence detecting means comprises:

first means responsive to said horizontal pulse signal and to the signal provided by said frequency dividing means for providing a signal that is in said first state when a pulse of said horizontal pulse signal overlaps a pulse provided by said frequency dividing means and that is in said second state otherwise; and second means, coupled to said first means for providing a pulse having a pulse width substantially equal to said predetermined number of periods of said horizontal pulse signal in response to the signal provided by said first means being in said first state.

3. The nonstandard signal detector set forth in claim 2 wherein the second means of said coincidence detecting means comprises:

a retriggerable one-shot circuit having a trigger input terminal coupled to said first means for providing an output pulse that has a pulse width substantially equal to twenty-five periods of said horizontal pulse signal.

4. The nonstandard signal detector set forth in claim 1 wherein the frequency dividing means comprises:

means coupled to said coincidence detecting means for providing first and second preset values in response to said control signal being in said first and second states respectively; and a programmable counter coupled to said preset value providing means and to said source of clock signal for counting a number of clock pulses substantially equal to the value provided by said preset value providing means and for producing an output pulse thereupon, said output pulse having a pulse width less than twice the period of said clock signal.

5. The nonstandard signal detector set forth in claim 1 wherein said horizontal pulse signal developing means comprises:

a phase locked loop for generating a horizontal pulse signal locked in frequency and phase to said horizontal synchronizing pulse signal component.

6. The nonstandard signal detector set forth in claim 5 wherein said coincidence detecting means comprises:

first means for providing a signal that is in said first state when a pulse of said horizontal pulse signal overlaps a pulse provided by said frequency dividing means and that is in said second state otherwise; and second means, coupled to said first means for providing a pulse having a pulse width substantially equal to said predetermined number of periods of said horizontal pulse signal in response to the signal provided by said first means being in said first state.

7. The nonstandard signal detector set forth in claim 6 wherein the second means of said coincidence detecting means comprises:

a retriggerable one-shot circuit having a trigger input terminal coupled to said first means for providing an output pulse that has a pulse width substantially equal to twenty-five periods of said horizontal pulse signal.

8. The nonstandard signal detector set forth in claim 7 wherein the frequency dividing means comprises:

means coupled to said coincidence detecting means for providing first and second preset values in response to said control signal being in said first and second states respectively; and a programmable counter coupled to said preset value providing means and to said source of clock signal for counting a number of clock pulses substantially equal to the value provided by said preset value providing means and for producing an output pulse thereupon, said output pulse having a pulse width not greater than twice the period of said clock signal.

9. In a video signal processing system including a source of composite video signals which may include a color burst signal component, a horizontal synchronizing pulse signal component and a vertical synchronizing pulse signal component, and means coupled to said source for developing a clock signal having a frequency substantially proportional to the frequency of said color burst signal, a nonstandard signal detector comprising:

frequency dividing means coupled to said clock signal developing means and responsive to a control signal being in first and second states for alternatively providing one of first and second pulse signals respectively, said first pulse signal having a frequency substantially equal to the average frequency of said horizontal synchronizing pulse signal and said second pulse signal having a frequency significantly different from the average frequency of said horizontal synchronizing pulse signal, the pulse width of said first and second pulse signals being less than twice the period of said clock signal;

means coupled to said source of composite video signals for developing a horizontal pulse signal which is substantially synchronized to said horizontal synchronizing pulse signal component and which has a pulse width that is less than one-half of the period of said color burst signal component;

coincidence detecting means coupled to said frequency dividing means and to said horizontal pulse signal developing means for generating a control signal for said frequency dividing means that is in said first state when the pulses of the signal provided by said frequency dividing means overlap the pulses of said horizontal pulse signal at least once in a predetermined number of periods of said horizontal pulse signal and that is in said second state otherwise; and means coupled to said coincidence detecting means and to said source of composite video signals for developing an indicating signal which changes from said first state to said second state substantially coincident with said control signal to indicate that nonstandard signals are being processed and which changes from said second state to said first state after said control signal has been in said first state for two periods of said vertical synchronizing pulse signal to indicate that standard signals are being processed.

10. The nonstandard signal detector set forth in claim 9 wherein said coincidence detecting means comprises:
first means responsive to said horizontal pulse signal and to the signal provided by said frequency dividing means for providing a signal that is in said first state when a pulse of said horizontal pulse signal overlaps a pulse provided by said frequency dividing means and that is in said second state otherwise; and
second means, coupled to said first means for providing a pulse having a pulse width substantially equal to said predetermined number of periods of said horizontal pulse signal in response to the signal provided by said first means being in said first state.

11. The nonstandard signal detector set forth in claim 10 wherein the second means of said coincidence detecting means comprises:
a retriggerable one-shot circuit having a trigger input terminal coupled to said first means for providing an output pulse that has a pulse width substantially equal to twenty-five periods of said horizontal pulse signal.

12. The nonstandard signal detector set forth in claim 9 wherein the frequency dividing means comprises:
means coupled to said coincidence detecting means for providing first and second preset values in response to said control signal being in said first and second states respectively; and
a programmable counter coupled to said preset value providing means and to said source of clock signal for counting a number of clock pulses substantially equal to the value provided by said preset value providing means and for producing an output pulse thereupon, said output pulse having a pulse width less than twice the period of said clock signal.

13. The nonstandard signal detector set forth in claim 9 wherein said indicating signal developing means comprises:
means coupled to said source of composite video signals for developing a frame control signal having a frequency one-fourth the frequency of said vertical synchronizing pulse signal and being resettable in response to a transition of said control signal from said first state to said second state; and
a flip-flop having a set input terminal coupled to said frame control signal developing means and having a reset input terminal coupled to said coincidence detecting means for developing said indicating signal.

14. The nonstandard signal detector set forth in claim 9 wherein said horizontal pulse signal developing means comprises:
a phase locked loop for generating a horizontal pulse signal locked in frequency and phase to said horizontal synchronizing pulse signal component.

15. The nonstandard signal detector set forth in claim 14 wherein said coincidence detecting means comprises:
first means responsive to said horizontal pulse signal and to the signal provided by said frequency dividing means for providing a signal that is in said first state when a pulse of said horizontal pulse signal overlaps a pulse provided by said frequency dividing means and that is in said second state otherwise; and
second means, coupled to said first means for providing a pulse having a pulse width substantially equal to said predetermined number of periods of said horizontal pulse signal in response to the signal provided by said first means being in said first state.

16. The nonstandard signal detector set forth in claim 15 wherein the second means of said coincidence detecting means comprises:
a retriggerable one-shot circuit having a trigger input terminal coupled to said first means for providing an output pulse that has a pulse width substantially equal to twenty-five periods of said horizontal pulse signal.

17. The nonstandard signal detector set forth in claim 16 wherein the frequency dividing means comprises:
means coupled to said coincidence detecting means for providing first and second preset values in response to said control signal being in said first and second states respectively; and
a programmable counter coupled to said preset value providing means and to said source of clock signal for counting a number of clock pulses substantially equal to the value provided by said preset value providing means and for producing an output pulse thereupon, said output pulse having a pulse width less than twice the period of said clock signal.

18. The nonstandard signal detector set forth in claim 17 wherein said indicating signal developing means comprises:
means coupled to said source of composite video signals for developing a frame control signal having a frequency one-fourth the frequency of said vertical synchronizing pulse signal and being resettable in response to a transition of said control signal from said first state to said second state; and
a flip-flop having a set input terminal coupled to said frame control signal developing means and having a reset input terminal coupled to said coincidence detecting means for developing said indicating signal.

* * * * *